(12) United States Patent
Kirrmann (10) Patent No.: US 8,582,424 B2
(45) Date of Patent: Nov. 12, 2013

(54) RING COUPLING NODES FOR HIGH AVAILABILITY NETWORKS

(75) Inventor: Hubert Kirrmann, Daettwil (CH)

(73) Assignee: ABB Research Ltd, Zürich (CH)

( * ) Notice: Subject to any disclaimer, the term of this patent is extended or adjusted under 35 U.S.C. 154(b) by 109 days.

(21) Appl. No.: 13/010,216

(22) Filed: Jan. 20, 2011

(65) Prior Publication Data

US 2011/0116508 A1 May 19, 2011

Related U.S. Application Data

(63) Continuation of application No. PCT/EP2009/059426, filed on Jul. 22, 2009.

(30) Foreign Application Priority Data

Jul. 22, 2008 (EP) .................................. 08160883

(51) Int. Cl.
*H04L 12/26* (2006.01)

(52) U.S. Cl.
USPC .......................................... 370/222; 370/392

(58) Field of Classification Search
CPC ....... H04L 12/66; H04L 12/437; H04L 12/42; H04W 4/18; H04W 8/26
USPC .......... 370/218, 222, 225, 389, 392, 401, 403
See application file for complete search history.

(56) References Cited

U.S. PATENT DOCUMENTS

| 5,781,545 A | 7/1998 | Matthew |
| 6,317,414 B1 | 11/2001 | Naohiro |
| 6,751,746 B1 | 6/2004 | Jain et al. |

(Continued)

FOREIGN PATENT DOCUMENTS

| EP | 1 231 541 A2 | 8/2002 |
| EP | 1 657 888 A1 | 5/2006 |
| EP | 1 768 328 A1 | 3/2007 |
| EP | 1 890 434 A1 | 2/2008 |
| FR | 2 893 205 A | 5/2007 |
| WO | WO 00/13376 A1 | 3/2000 |

(Continued)

OTHER PUBLICATIONS

International Search Report (PCT/ISA/210) for PCT/EP2009/059426 dated Sep. 16, 2009.

(Continued)

*Primary Examiner* — Jung Park
(74) *Attorney, Agent, or Firm* — Buchanan Ingersoll & Rooney PC (57) ABSTRACT

Exemplary embodiments are directed to a network coupling device connected over a respective first and second port in a communication network with a ring topology operating with full duplex links. When sending information, the coupling device inserts two duplicate frames in the ring, one over each of its ports. The frames containing information that identifies these two frames as a pair of duplicates of the same frame. Each similar device in the ring includes a Switching Element that receives a frame from one port and forwards the frame to the other port without modification. The Switching Element discards a frame that was originally sent by that same node, discards a frame that it already forwarded in that direction, and/or discards a frame that it cannot recognize as being a member of a pair. A further similar device on the ring is able to receive the two duplicate frames and pass the earlier received frames of a pair to the application, while discarding the later, received frames based on the identification within the frames.

5 Claims, 4 Drawing Sheets

(56) References Cited

U.S. PATENT DOCUMENTS

| | | |
|---|---|---|
| 6,831,898 B1 | 12/2004 | Edsall et al. |
| 6,856,594 B1 | 2/2005 | Aihara et al. |
| 6,990,066 B1 | 1/2006 | Buckland et al. |
| 7,035,208 B1 | 4/2006 | Najda et al. |
| 2001/0018328 A1 | 8/2001 | Ohkura et al. |
| 2002/0027877 A1 | 3/2002 | Son et al. |
| 2002/0075873 A1 | 6/2002 | Lindhorst-Ko et al. |
| 2002/0107980 A1 | 8/2002 | Kawaguchi |
| 2002/0126661 A1 | 9/2002 | Ngai |
| 2003/0048782 A1 | 3/2003 | Rogers et al. |
| 2003/0118042 A1 | 6/2003 | Nishida et al. |
| 2004/0008719 A1 | 1/2004 | Ying |
| 2004/0008720 A1 | 1/2004 | Wang et al. |
| 2004/0139123 A1 | 7/2004 | Glad et al. |
| 2004/0199662 A1 | 10/2004 | Karol et al. |
| 2006/0147209 A1* | 7/2006 | Tian et al. .................. 398/59 |
| 2007/0223533 A1 | 9/2007 | Kirrmann et al. |
| 2007/0274229 A1 | 11/2007 | Scholl et al. |
| 2008/0059651 A1 | 3/2008 | Ashwood Smith |
| 2008/0279181 A1* | 11/2008 | Shake et al. ................. 370/389 |
| 2010/0014527 A1 | 1/2010 | Sakauchi et al. |

FOREIGN PATENT DOCUMENTS

| | | |
|---|---|---|
| WO | WO 2004/006481 A2 | 1/2004 |
| WO | WO 2004/056049 A1 | 7/2004 |
| WO | WO 2004/059921 A | 7/2004 |
| WO | WO 2006/053459 A1 | 5/2006 |
| WO | WO 2007/040417 A1 | 4/2007 |

OTHER PUBLICATIONS

Written Opinion (PCT/ISA/237) for PCT/EP2009/059426 dated Sep. 16, 2009.

European Search Report for EP 08160883 dated Sep. 29, 2008.

English translation of Office Action mailed Nov. 6, 2012 in corresponding Japanese Patent Application No. 2011-519161.

Holness, Marc, "Spatially Aware Sublayer DB operations." Nortel Networks, IEEE 802.17 WG—802.17b SG, Ottawa, Ontario, Jan. 30, 2005.

\* cited by examiner

RING COUPLING NODES FOR HIGH AVAILABILITY NETWORKS

RELATED APPLICATIONS

This application claims priority as a continuation application under 35 U.S.C. §120 to PCT/EP2009/059426, which was filed as an International Application on Jul. 22, 2009 designating the U.S., and which claims priority to European Application 08160883.8 filed in Europe on Jul. 22, 2008. The entire contents of these applications are hereby incorporated by reference in their entireties.

FIELD

The disclosure relates to a communication system, such as industrial communication systems that use redundant communication networks for controlling time-critical processes, in vehicle control, drive control, or substation automation.

BACKGROUND INFORMATION

In industrial communication systems availability and reliability are key issues for time-critical applications such as vehicle control, drive control or substation automation because a failing communication system can lead to an interruption of the application, a shutdown of an industrial plant, or a crash of a vehicle controlled by the latter. Therefore, communication network redundancy is an important feature of industrial communication systems demanding high availability, in particular those systems using Ethernet-based communication with commercial switches.

A key factor of a redundant system is the recovery delay in case of failure, i.e. the time it takes until a redundant component takes over the role of a failed component. Time-critical processes have specified recovery delays on the order of milliseconds or, preferably, even a seamless recovery invisible to the plant. If a delay is too long the interruption in service can trigger a plant shutdown or otherwise cause damage.

In case of failure, seamless operation can be provided by using two local area networks operated in parallel. This involves doubling the electrical or optical transmission cables and switches, as well as at least the physical layer of the corresponding protocol stack of the devices, and attaching a device to each of the two local area networks through two independent transceivers and lines. For each frame to be transmitted, a sender sends two frames nearly simultaneously over the two independent lines while the receiver listens to both lines, accepts whichever frame of a pair of redundant frames comes first, and discards the later frame. Operation in case of failure of one network element is seamless, since there is no need to repeat a frame in case of disruption of one path. The tagging of redundant frames offers a complete supervision of both redundant lines with normal traffic, ensuring a high coverage. This method has been described in patent application WO 2006/053459 and standardized as Parallel Redundancy Protocol (PRP) in IEC standard 62439. However, PRP requires a complete and hence rather uneconomical duplication of the local area network.

In a ring network, switching nodes have two communication ports connecting to two neighbor nodes and being able to forward frames from one port to the other according to bridging rules. A switching element can also be integrated within the node where the source or destination application runs, thus forming a switching end node. With full-duplex links, the ring network can be operated in either or both directions. As a result, the ring network offers resiliency against link failure. Ring protocols are known from a Fiber Distributed Data Interface (FDDI) or Token Ring, and can also be implemented with Ethernet, in which case protocols such as Rapid Spanning Tree Protocol (RSTP) (IEEE 802.1D) ensure that frames cannot circulate indefinitely on the ring. A ring topology provides a cost-effective redundancy, since only one additional link is needed to protect against any single link failure.

WO 2004/056049 discloses a substation-specific ring network normally operated in a first communication direction along a so-called primary ring. In the event of a fault on the primary ring, a part of the latter may be short-circuited by a part of a secondary ring. This ring network offers the same availability as PRP against link failures. The switchover operation, however, introduces a long recovery delay. In general, any restoration based on the redirection of the information flow on the still available links after detection of a failure is likely to introduce a recovery delay that can be incompatible with the specifications of a higher level application.

Nodes belonging to the ring can be specified to include two network interfaces, a property not shared by commercial off-the-shelf non-ring devices such as printers, servers or laptop computers. FR 2893205 discloses to connect such a device in a point-to-point link to a dedicated switching-inserting node which in turn is connected to a first and a second unidirectional ring. The two rings jointly realize bidirectional data transmission with seamless redundancy. However, since each switching node introduces a forwarding delay, the number of non-ring devices in ring networks is generally limited.

SUMMARY

An exemplary embodiment is directed to a ring coupling node. The node includes a first and second ring communication ports connected to first and second neighbor nodes, respectively, of a communication ring, and a third non-ring communication port. The ring-coupling node stores program code that causes the ring-coupling node to execute the steps of receiving from a source device, via the third non-ring communication port, a source frame addressed to a destination node in the communication ring, storing an identification of the source device, generating two ring frames that contain the same information as the source frame, and transmitting, via the first and the second ring communication port, respectively, the two ring frames to the first and second neighbor node.

An exemplary embodiment is directed to a method of coupling a source device to a communication ring that includes a ring coupling node with first and second ring communication ports connected to first and second neighbor nodes of the communication ring, respectively. The method is executed by the ring coupling node includes receiving, from the source device, via a third non-ring communication port, a source frame addressed to a destination node in the communication ring, storing an identification of the source device, generating two ring frames containing the same information as the source frame, and transmitting, via a first and the second ring communication port, respectively, the two ring frames to the first and second neighbor node.

BRIEF DESCRIPTION OF THE DRAWINGS

The subject matter of the disclosure will be explained in more detail with reference to exemplary embodiments which are illustrated in the attached drawings, of which

The reference symbols used in the drawings, and their meanings, are listed in summary form in the list of reference symbols. In principle, identical parts are provided with the same reference symbols in the figures.

DETAILED DESCRIPTION

An objective of the disclosure is to increase the number of devices that can be accessed over a highly available and seamlessly redundant ring-type communication network for controlling time-critical processes.

According to the present disclosure, a source node, which is in a ring type communication network with a plurality of switching nodes and operating with full duplex links, injects pairs of redundant ring frames. For each source frame injected into the ring network, a first and a second ring frame are transmitted in opposite directions. Both frames are relayed by other nodes of the ring network until they eventually return back to the source node. As a result, network traffic is roughly doubled with respect to a conventional ring network. A destination node thus receives, in the fault-free state, two redundant frames with the same content. The destination node forwards the earlier or first frame of the two frames to its upper layer protocols and discards the later or second frame. Ring coupling or switching intermediary nodes are provided for connecting communication devices without inherent ring functionality and/or for coupling source or destination devices that are part of a peer network rather than the communication ring. For any source frame transmitted from a source device connected to a third or non-ring communication port of the ring coupling node, an identification of the source device is registered. This enables the ring coupling node to distinguish ring frames originating from a plurality of connected source devices.

The ring coupling node can include a third communication port linked to a single non-ring device or to a switch to which a plurality of non-ring devices are connected. In this basic configuration, the coupling node receives frames from a non-ring device, duplicates them without changing their source address, and injects them into the ring. A ring coupling node behaves like a switching node and removes the frames injected into the ring when they return. The ring coupling node forwards frames and receives the frames intended for the extra-ring devices it represents while discarding their duplicates. The ring coupling node keeps a Proxy Node Table with suitable identifications or addresses of the non-ring devices for which it is the proxy. This table is kept up-to-date by removing entries corresponding to non-active non-ring devices after a specified time-out period.

In general, redundant frames can be readily identified as duplicates e.g. due to the sender node appending to each frame a trailer according to the IEC 62439 (PRP) standard and including a sequence number, an identifier of a path in the ring network, and a length field that allows recognizing frames as PRP duplicates in conjunction with the Media Access Control (MAC) source address. Likewise, a ring redundancy identifier (i.e. the tag foreseen in IEC 62439-3 HSR) that includes an indication as to the source node and a source-specific sequence number allows identifying duplicate ring frames. The detection of duplicates can be done by tracking the sequence numbers corresponding to a source, by means of hash tables or other memorization.

A further exemplary embodiment variant provides an additional safeguard against frames which, due to failure or untimely removal of the originating sender node, are not removed from the ring by recognition of the source address. In particular, each node can identify and refrain from sending frames in a particular direction, i.e. through a particular communication port, that the node has already sent in that same direction. The case is identified, e.g. based on the MAC source address of the frames, can be considered an extension of the PRP algorithm and applied to each relaying direction separately. An identifier of a clockwise or counter-clockwise relaying direction in the ring network appended to each frame can assist in this distinction.

According to another exemplary embodiment of the present disclosure, a pair of ring coupling nodes is used in a modified form as PRP-to-ring coupling nodes to couple a ring network to a duplicated PRP network with two LANs, in which case the PRP-to-ring coupling node recognizes the PRP trailers and generates the corresponding PRP trailers, while behaving as stated above on the ring. So each PRP LAN is coupled independently to the ring.

In another exemplary embodiment, two peer rings can be connected by a pair of ring-ring coupling devices (RRC devices), ensuring freedom of single point of failure, both devices acting identically. For every one frame on a peer ring that arrives to an RRC device, two frames are generated on the other peer ring, and since there are two copies of the same frame in a peer ring, this would mean that four frames would circulate in the second peer ring. The property of the ring node devices not to forward a frame they it already sent achieves that only one frame circulates in one direction over the second peer ring.

An exemplary embodiment of the present disclosure also relates to a computer program product, such as a computer readable medium, memory integrated into the ring coupling node, and a data carrier that can be inserted into the node, having computer program code means recorded and stored thereon. The computer program code means having executable on a processor of a ring coupling node in a communication network of a process control system.

In summary, the present disclosure combines the seamless property of PRP and the low hardware costs of ring networks and provides for seamless recovery in a ring network. Connecting devices that are not inherently ring compatible, coupling highly available rings with a redundant network, and coupling two or more peer rings become possible.

Figure 1:
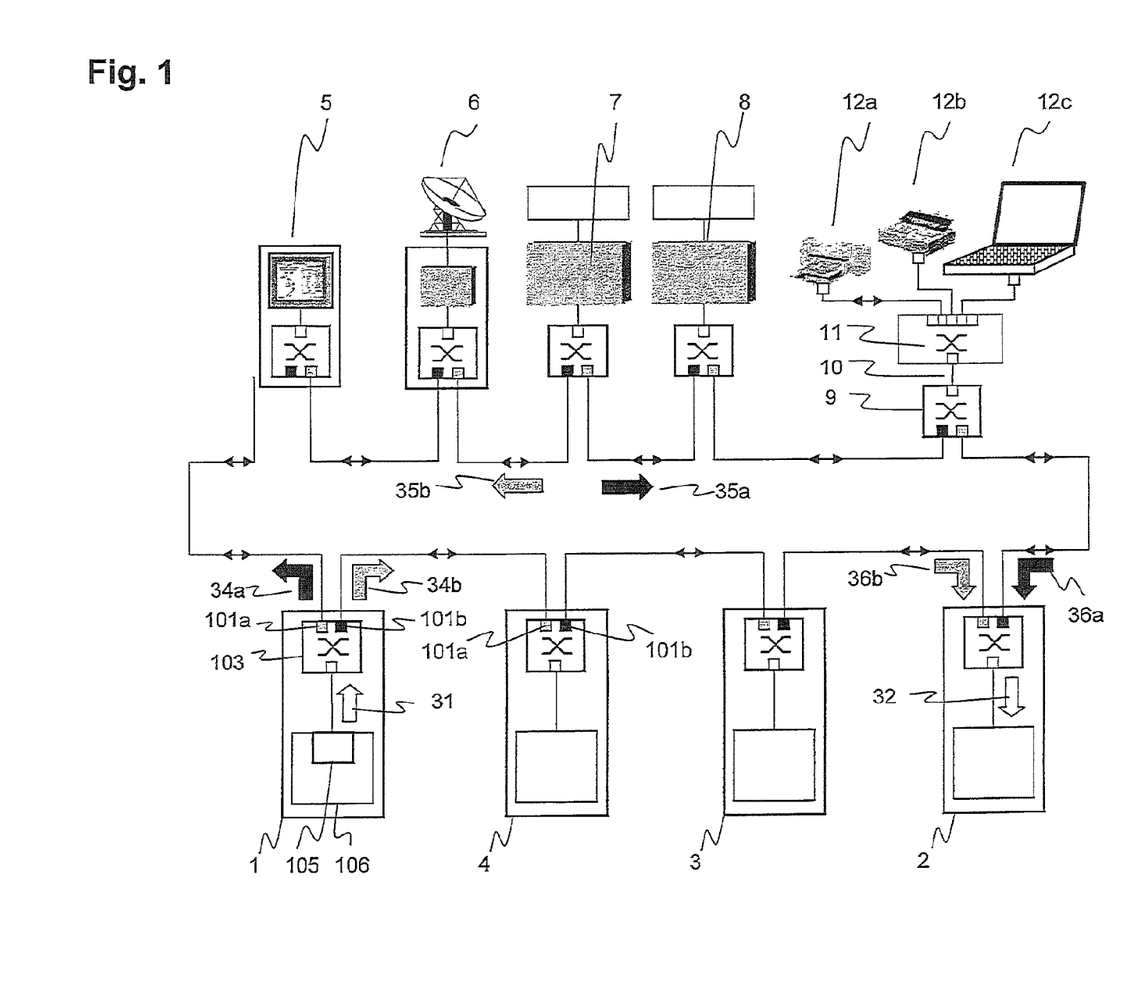
FIG. 1 shows a state-of-the-art automation network in ring topology in accordance with an exemplary embodiment.

FIG. 1 illustrates a state-of-the-art automation network with a ring topology in accordance with an exemplary embodiment. The automation network can be configured such that all switching nodes within the ring (1-9), such as protection, control, and measuring devices (1-4), a supervision workstation (5), a GPS clock master (6), redundant telecontrol gateways (7, 8) and a ring coupling node (9), include a switch element (103) that can forward ring frames (35a, 35b) from one ring communication port (101a, 101b) to another. As a result of this configuration the circulation of frames around the ring is ensured. The ring coupling node (9) connects, via interlink network connection 10, to a conventional switch 11 that in turn couples a printer (12a), server (12b), and laptop computer (12c) as exemplary non-ring devices to the ring network. The switch element of a sender end node (1) can inject a source frame (31), which is received from the higher protocol layers (106) through the link layer entity (105), as a pair of redundant ring frames (34a, 34b) in both directions of the ring. The switch element of a destination node (2) can receive frames (36a, 36b) from either direction of the ring and pass a destination frame (32) to its own higher layer protocols.

While a variety of devices for interrupting the ring (tokens, test frames, . . . ) can be used to avoid permanently circulating frames, in exemplary embodiments of the present disclosure a node forwards a frame that it receives over one port to the other port, unless the same frame was previously forwarded in the same direction, such as when the node is the original source of the frame. In addition, a node that is the only destination of a unicast frame can refrain from forwarding that frame to reduce traffic.

To ensure seamless redundancy, an exemplary embodiment of the present disclosure has a switching end node that sends a frame received from its higher layer protocols over both its ports, that the two duplicates of the frame circulate over the ring in opposite directions until each reaches frame respective original source node or are removed by a respective destination node. The latter passes only the earlier frame of a pair to its higher layer protocols and discards the later frame of the pair as a duplicate.

Figure 2:
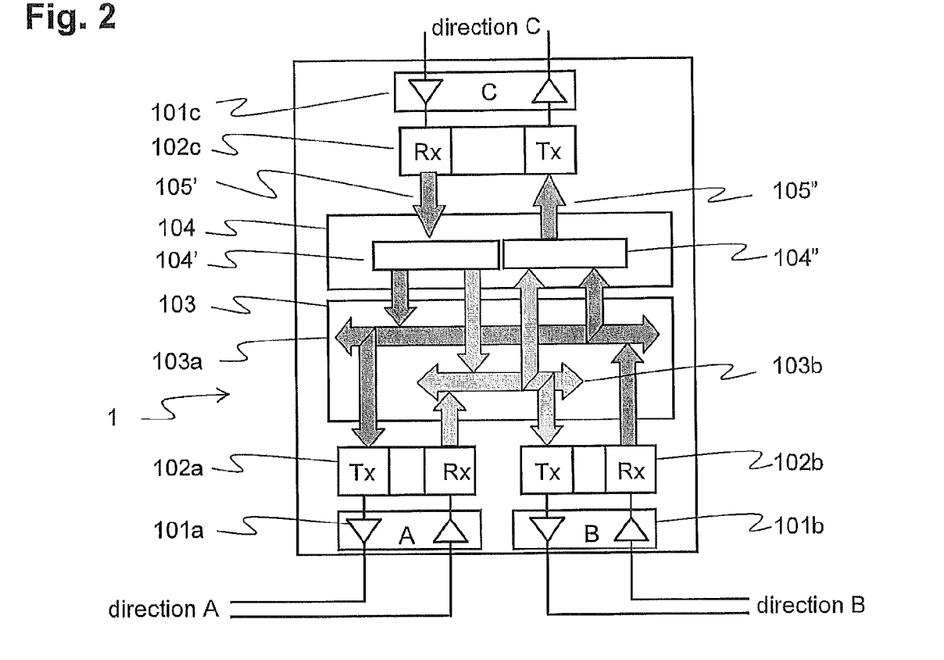
FIG. 2 illustrates an internal structure of a ring coupling node in accordance with an exemplary embodiment.

FIG. 2 illustrates an internal structure of a ring coupling node (9) according to an exemplary embodiment. The ring coupling node can be included in logic that can be executed in hardware, programmable logic, and/or a processor under control of a stored program. The ring coupling node includes two ring communication ports (101a, 101b), one for each direction, transceivers and decoding/encoding logic (102a, 102b), which allows a generation and checking of content of the frames, especially that the frame is properly formed. The decoding/encoding logic can be connected to a switch element (103).

The switch element (103) can transfer frames from a first to a second ring communication port directly over two busses (103a, 103b) corresponding to the two directions of transfer on the ring, provided it is not the originator of the frame or did not previously send the same frame. The switch element can detect that this frame was originally or previously sent, by inspecting the source address and other information in the frame. The switching element (103) is connected to the Link Redundancy Entity (LRE) (104).

Source frames to be transmitted can be received from non-ring devices (12a-12c), or from other source devices connected to a third, non-ring communication port (101c) of the ring coupling node (9). The source frame (105') is passed to the LRE which has means (104') for duplicating this frame and to append a ring redundancy identifier to the duplicated frame. The LRE generates two frames which switch element (103) sends on the ring, one in each direction A or B, essentially simultaneously and as soon as the medium is available.

In reception, the switch element passes both received frames to the LRE, which has means (104") for passing only the first frame (105") of a pair to a transceiver and decoding/encoding logic (102c) of the third non-ring communication port (101c). As a result, a ring redundancy identifier that includes, e.g. a source node identifier and a sequence number, can be discarded. The LRE discard can be done in interaction with a network controller or entirely in programmable logic.

Figure 3:
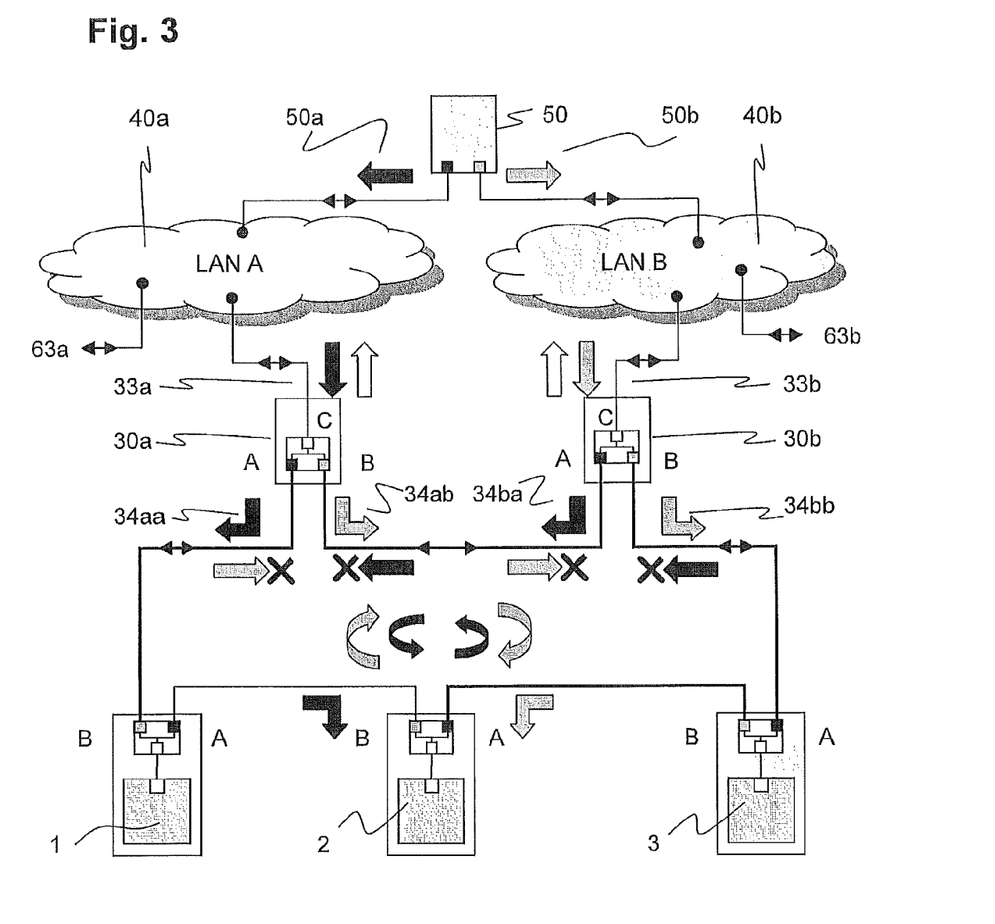
FIG. 3 illustrates a ring network coupled to a redundant network in accordance with an exemplary embodiment.

FIG. 3 illustrates a ring network coupled to a redundant network in accordance with an exemplary embodiment. In FIG. 3, a sending node (50) operating according to the PRP protocol sends frame duplicates (50a, 50b) to two redundant or duplicated local area networks or links designated as LAN A (40a) and LAN B (40b). The frames are forwarded to interlinks (33a, 33b) and received by ring coupling nodes (30a, 30b). Among these nodes, the PRP-to-ring coupling node on LAN A (30a) inserts two ring frames into the ring (34aa and 34ab) via both communication ports A and B, while the PRP-to-ring coupling node on LAN B (30b) inserts two ring frames into the ring (34ba, 34bb) at a presumed different time. Hence, the detection mechanism for circulating ring frames will allow only two frames to circulate over the ring, since if frame 34ab arrives at ring coupling node 30b before frame 34bb has been sent, frame 34ab will be forwarded, and frame 34bb will not be sent. Conversely, if frame 34bb was sent before frame 34ab arrives at node 30b, frame 34ab will not be forwarded. The ring redundancy information identifies duplicates even if they originate from different LANs 40a and 40b.

Both frames are forwarded over the ring by the switching nodes (1-3 and possibly 30a, 30b) and arrive with a certain delay to the destination node (2), which processes the first frame of a pair and discards the duplicate. When the frame (34aa) sent by the ring coupling coupling node (30a) reaches that node again, it is discarded since that node registers all frames it sends on behalf of LAN A and thus identifies the frame as already sent. However, that frame could also have been frame 34ba originally sent by ring coupling node 30b, since from a protocol point of view, frames 34aa and 35ba are not distinguishable and identified as duplicates by means of their ring redundancy identifiers which include an identification of the source device (50) as well as a source sequence number.

The PRP-to-ring coupling node on LAN A (30a) relays the first frame originating from a source node (1-3) and directed to one of the nodes in the LAN A that it represents, removes the ring redundancy identifier, inserts a PRP trailer and sends the frame to LAN A. Similarly, the PRP-to-ring coupling node on LAN B (30b) does the same for the nodes in LAN B it represents, wherein exemplary PRP node 50 is represented in both PRP-to-ring coupling nodes.

More than one ring can be connected to the duplicated network, by means of additional interlinks (63a, 63b) and corresponding PRP-to-ring coupling devices (not shown).

Figure 4:
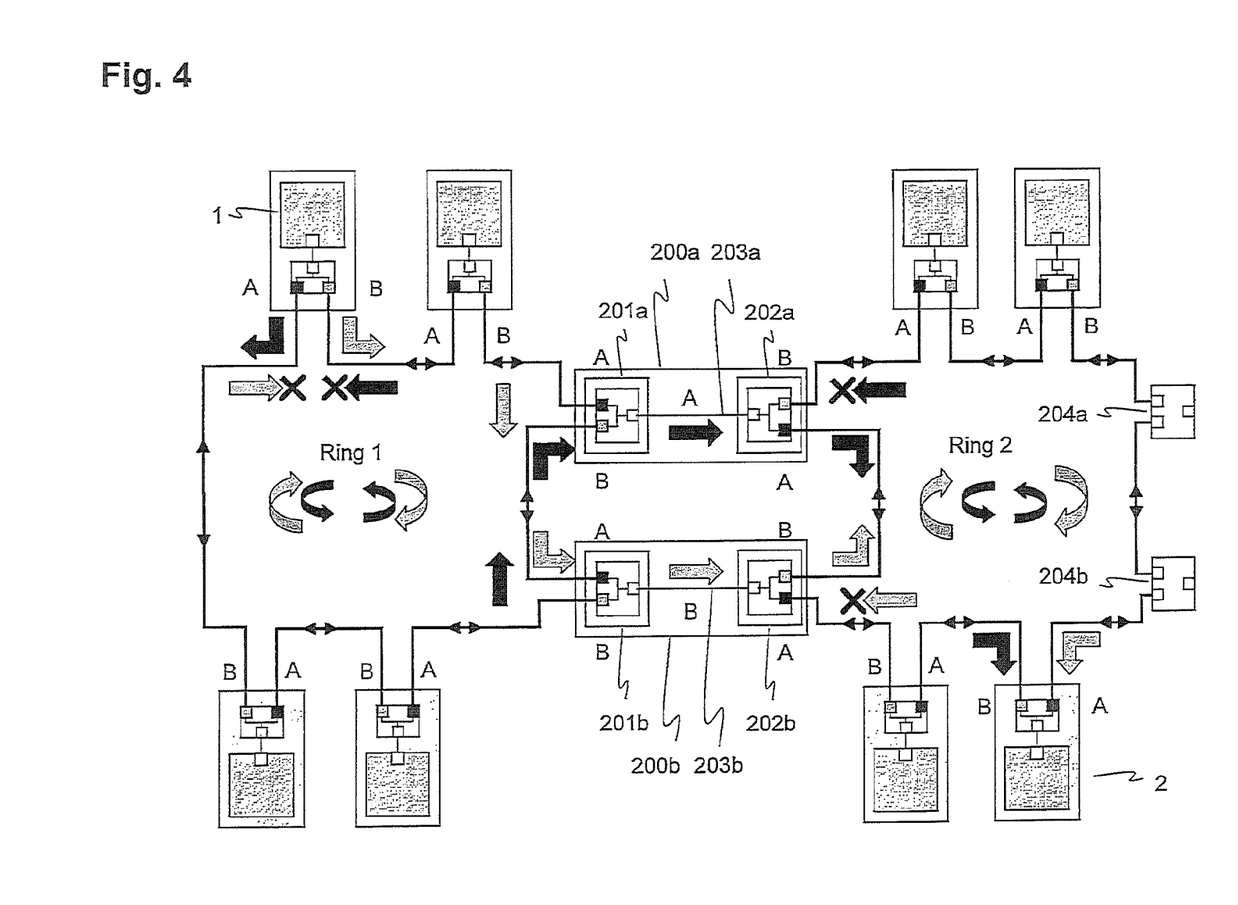
FIG. 4 illustrates a ring network coupled to a peer ring network in accordance with an exemplary embodiment.

FIG. 4 illustrates a ring network coupled to a peer ring network in accordance with an exemplary embodiment. In this embodiment, two pairs of ring coupling nodes (201a, 201b; 202a, 202b) are used to connect two rings. Each ring-to-ring coupling can be operated as a pair of PRP-to-ring coupling devices described in connection with FIG. 3 arranged "back-to-back". For further simplification, two devices (201a, 202a; 201b, 202b) of a pair of coupling nodes can be integrated into one ring-to-ring coupling (RRC) device (200a, 200b) and the interlink (203a, 203b) can then be reduced to an internal connection of an RRC device. In this configuration, the ring redundancy identifier of a source frame in one ring can be passed on unaltered to the two corresponding ring frames in the other ring.

In another simplification, such an RRC device does not keep track of the represented devices in each ring, but it is advantageous that the RRC devices can filter multicast and VLAN traffic as needed for the quality of service. Further peer rings can be connected by further pairs of PRP coupling nodes (204a, 204b) or RRC devices.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes

LIST OF DESIGNATIONS 1-8 switching nodes
9 ring coupling node
10 interlink network connection
11 switch to non-ring nodes
12a, 12b, 12c non-ring nodes
30a PRP-to-ring coupling node for direction A
30b PRP-to-ring coupling node for direction B
31 source frame
32 destination frame
33a interlink connecting coupling node A to LAN A
33b interlink connecting coupling node B to LAN B
34a, 35a, 36a frame circulating in direction A
34b, 35b, 36b frame circulating in direction B
34aa frame sent by LAN A in direction A
34ab frame sent by LAN A in direction B
34ba frame sent by LAN B in direction A
34bb frame sent by LAN B in direction B
40a LAN A
40b LAN B
50 PRP device
50a frame sent over one LAN A by a PRP device
50b frame sent over one LAN B by a PRP device
63a interlink to another ring in direction A
63b interlink to another ring in direction B
101a-101c communication ports
102a-102c decoding/encoding logic
103 switch element
103a, 103b internal bus for transferring frames from one port to the other
104 Link Redundancy Entity (LRE)
104' Frame duplicator (inserts the redundancy information)
104" Filter for discarding a duplicate frame
105' Frame to send passed by the higher layers over the link layer interface
105" Frame received from the LRE to be passed to the higher layers
200a RRC coupling device A between ring 1 and ring 2
200b RRC coupling device B between ring 1 and ring 2
201a PRR-to-ring coupling node in ring 1 in direction A
201b PRP-to-ring coupling node in ring 1 in direction B
202a PRP-to-ring coupling node in ring 2 in direction A
202b PRP-to-ring coupling node in ring 2 in direction B
203a Interlink A between ring 1 and ring 2
203b Interlink B between ring 1 and ring 2
204a further PRP-to-ring coupling node in ring 2 in direction A
204b further PRP-to-ring coupling node in ring 2 in direction B

What is claimed is:

1. A ring coupling node comprising:
   first and second ring communication ports connected to first and second neighbor nodes, respectively, of a communication ring; and
   a third non-ring communication port, the ring-coupling node storing program code that causes the ring-coupling node to execute the steps of:
   receiving from a source device, via the third non-ring communication port, a source frame addressed to a destination node in the communication ring;
   storing an identification of the source device;
   generating two ring frames that contain the same information as the source frame;
   transmitting, via the first and the second ring communication ports, respectively, the two ring frames to the first and second neighbor nodes;
   forwarding to the third non-ring communication port an earlier frame of a pair of ring frames addressed to a destination device connected to the third non-ring communication port and received from a source node in the communication ring via the first and the second ring communication port, respectively;
   rejecting a later frame of the pair;
   generating, based on a ring redundancy identifier included in the earlier ring frame, a destination redundancy identifier associated with the destination device; and replacing in the forwarded ring frame, the ring redundancy identifier with the destination redundancy identifier; and
   generating a destination redundancy identifier based on the IEC 62439 (PRP) standard in case the destination device and the coupling node are connected to the same PRP LAN (A, B), or in case the ring frame is a multicast frame to be received by a non-PRP device.

2. The ring coupling node according to claim 1, wherein the stored program code causes the ring coupling node to execute the step of:
   generating a ring redundancy identifier based on a source redundancy information included in the source frame, wherein the two ring frames include the identification of the source device, and the ring redundancy identifier.

3. The ring coupling node according to claim 1, wherein the stored program code causes the ring coupling node to execute the step of:
   forwarding a ring frame received from the first ring communication port to the second ring communication port, if a ring frame containing the same information has not previously sent via the second ring communication port.

4. The ring coupling node according to claim 1, wherein the stored program code causes the ring coupling node to execute the steps of:
   forwarding a ring frame received via the first ring communication port to the other ring communication port, if the ring frame was neither previously received via the first ring communication port nor transmitted by the ring coupling node;
   retaining an earlier frame of a pair of ring frames addressed to a destination device connected to the third non-ring communication port and received from a source node in the communication ring via the first and the second ring communication port, respectively; and
   rejecting a later frame of the pair.

5. A method of coupling a source device to a communication ring that includes a ring coupling node with first and second ring communication ports connected to first and second neighbor nodes of the communication ring, respectively, the method executed by the ring coupling node comprising:
   receiving, from the source device, via a third non-ring communication port, a source frame addressed to a destination node in the communication ring;
   storing an identification of the source device;
   generating two ring frames containing the same information as the source frame;
   transmitting, via a first and the second ring communication ports, respectively, the two ring frames to the first and second neighbor nodes;
   forwarding to the third non-ring communication port an earlier frame of a pair of ring frames addressed to a destination device connected to the third non-ring communication port and received from a source node in the communication ring via the first and the second ring communication port, respectively;

rejecting a later frame of the pair;

generating, based on a ring redundancy identifier included in the earlier ring frame, a destination redundancy identifier associated with the destination device; and replacing in the forwarded ring frame, the ring redundancy identifier with the destination redundancy identifier; and generating a destination redundancy identifier based on the IEC 62439 (PRP) standard in case the destination device and the coupling node are connected to the same PRP LAN (A, B), or in case the ring frame is a multicast frame to be received by a non-PRP device.

* * * * *